(No Model.)

G. A. EGG.
VELOCIPEDE.

No. 444,341. Patented Jan. 6, 1891.

Witnesses.
Ed Willis
R. F. Loggio

Inventor.
Gustave A. Egg
By Atty's Hallock & Hallock

UNITED STATES PATENT OFFICE.

GUSTAVE A. EGG, OF ERIE, PENNSYLVANIA, ASSIGNOR OF ONE-THIRD TO JOSEPH A. ROTH, OF SAME PLACE.

VELOCIPEDE.

SPECIFICATION forming part of Letters Patent No. 444,341, dated January 6, 1891.

Application filed May 10, 1890. Serial No. 351,272. (No model.)

*To all whom it may concern:*

Be it known that I, GUSTAVE A. EGG, a citizen of the United States, residing at Erie, in the county of Erie and State of Pennsylvania, have invented certain new and useful Improvements in Velocipedes; and I do hereby declare the following to be a full, clear, and exact description of the invention, such as will enable others skilled in the art to which it appertains to make and use the same.

This invention relates to velocipedes or bicycles; and it consists in certain improvements in the construction thereof, as will be hereinafter fully set forth, and pointed out in the claims.

My invention relates to the propelling-gearing of velocipedes.

Figure 1:
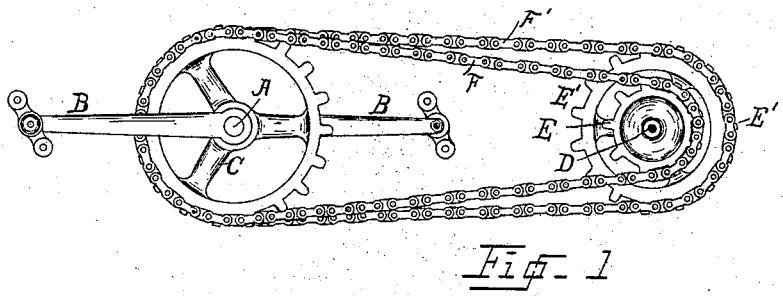
Figure 2:
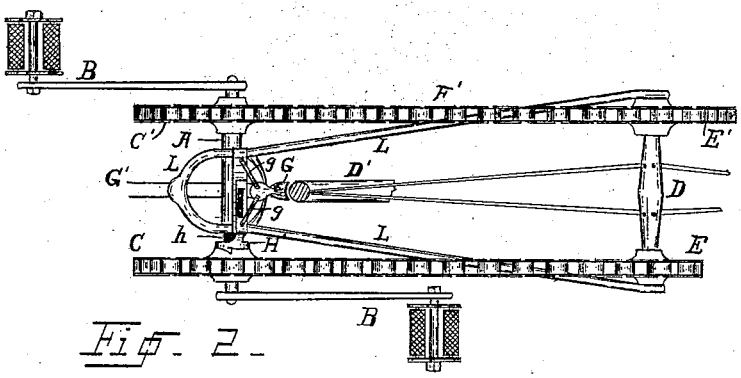
Figure 3:
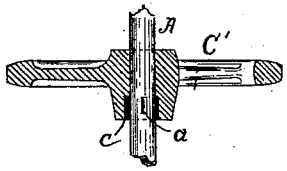
Figure 4:
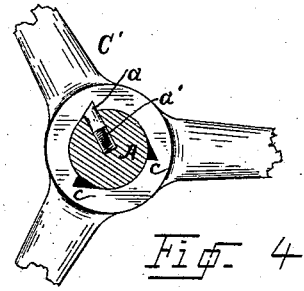

My invention is illustrated in the accompanying drawings, as follows:

Figure 1 is a side elevation of the propelling-gearing. Fig. 2 is a top view of the same and shows a fragment of the driving-wheel. Fig. 3 is a horizontal section through the driving gear-wheel C'. Fig. 4 is an enlarged view of the side of the hub of said wheel C', with the axle in cross-section.

A is the shaft of the treadle device.

B B are the treadles.

C and C' are driving-gears or sprockets on the shaft A.

D is the shaft of the driving-wheel D'.

F F' are sprocket chains or belts communicating power from the wheel C' to the wheel E', respectively.

The two wheels C and C' are of the same diameter, preferably; but the wheels E and E' are of different diameters. Both the wheels C and C' connect with the shaft A by clutches, so that if either of them is not in engagement it will move loosely on the shaft. The wheel C, which connects with the small gear E, is brought into engagement with the shaft A by a spur-clutch H, which slides on the shaft A. This clutch is moved into engagement by a spring *h* and out of engagement by toggle-levers *g g*, which are connected at their adjoining ends with the brake G, which is moved by the rods G', which connect with a hand grip-lever on the steering-bar in the usual manner. Only the lower ends of the rods G' are shown, as the means which operate these rods are common and well understood and form no part of the present invention.

When the brake is moved toward the wheel D', the clutch H is disengaged from the wheel C before the brake is brought against the wheel D', so that the rider can disengage wheel C without setting the brake against the wheel D', and when the brake is set it is desirable that the wheel C be disengaged. The wheel C' engages with the shaft A by means of a pawl-and-ratchet appliance. The ratchet-notches *c* are on the inner wall of the hub of the wheel C', (see Fig. 4,) and the pawl *a* acts from a mortise in the shaft A and is impelled outwardly by a spring *a'*. It will be observed that when the clutch H is in engagement with the wheel C that wheel becomes a driving-gear, and as it is in connection with the smaller wheel E the axle D will rotate faster than the shaft A, and as the wheels E' and C' are of the same size the wheel C' will be moved faster than the shaft A, and hence the pawl *a* can make no engagement with the ratchet-notches *c;* but as soon as the clutch H is thrown out of engagement and the wheel C becomes loose the speed of the wheel D' will slacken and the pawl-and-ratchet clutch of the wheel C' will come into action and the wheel C' will become the propelling-gear. The rider will use the clutch H and engage the wheel C when he is running on smooth level roads and desires to go at high speed; but when on a rough road or going up a grade he will hold the clutch H out of engagement and propel his machine from the gear C'. When running down a smooth grade the rider can hold the treadle still and disengage the clutch H and run without exertion, using the brake G as he desires and using the treadles as a foot-rest, for whenever the speed of the wheel E' is greater than the shaft A the wheel C' moves freely on the shaft.

It is not necessary that the clutch H be operated from or in connection with the brake mechanism, as it may have a separate operating mechanism as well as not; but it is of course cheaper and equally if not more convenient to operate it from the brake mechanism.

I am aware that heretofore velocipedes have been made wherein there were two sets of driving belts and pulleys with differing diameters, so as to vary the speed, and I shall not broadly claim such construction, my invention consisting in improvements thereon, first, whereby the low-speed gearing will automatically become inoperative when the high-speed gearing is in use, and when the high-speed gearing is thrown off the low-speed gearing will be automatically thrown into action, and, secondly, whereby the clutch which brings the high-speed gearing into action is controlled through the brake-actuating mechanism.

What I claim as new is—

1. In a velocipede, the combination of a driving-shaft and a driven shaft, two distinct sets of gearings connecting said shafts, one of which is adapted to move the driven shaft faster than the other, a manually-actuated clutch controlling the high-speed gearing, and an automatically-actuated clutch controlling the low-speed gearing, substantially as and for the purposes set forth.

2. In a velocipede, the combination of a driving-shaft, two driving-gears on said shaft, one of which is connected therewith by an automatically-acting clutch and the other by a manually operated clutch, and a driving-wheel having on its shaft two gear-wheels, one of which is of a less diameter than the other and is driven from the driving-gear on the treadle-shaft, which is controlled by the manually-operated clutch, the other being driven from the driving-gear having the automatically-acting clutch.

3. In a velocipede, the combination of a driving-shaft and a driving-wheel driven from said shaft, two gears on the driving-shaft which engage therewith by clutches, one of which acts automatically and the other is moved from the brake mechanism, and two gears on the shaft of the driving-wheel, one of which is smaller than the other and is driven from the driving-gear, which is clutched through the action of the brake mechanism.

In testimony whereof I affix my signature in presence of two witnesses.

GUSTAVE A. EGG.

Witnesses:
JNO. K. HALLOCK,
CLARK M. COLE.